(12) United States Patent
Beck et al.

(10) Patent No.: US 9,951,846 B2
(45) Date of Patent: Apr. 24, 2018

(54) TRANSMISSION FOR USE IN A MOTOR VEHICLE

(71) Applicant: ZF Friedrichshafen AG, Friedrichshafen (DE)

(72) Inventors: Stefan Beck, Eriskirch (DE); Christian Sibla, Friedrirchshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 209 days.

(21) Appl. No.: 14/646,602

(22) PCT Filed: Oct. 24, 2013

(86) PCT No.: PCT/EP2013/072225
§ 371 (c)(1),
(2) Date: May 21, 2015

(87) PCT Pub. No.: WO2014/079642
PCT Pub. Date: May 30, 2014

(65) Prior Publication Data
US 2015/0285341 A1    Oct. 8, 2015

(30) Foreign Application Priority Data

Nov. 21, 2012  (DE) ........................ 10 2012 221 236

(51) Int. Cl.
*F16H 3/66*    (2006.01)

(52) U.S. Cl.
CPC ....... *F16H 3/66* (2013.01); *F16H 2200/0008* (2013.01); *F16H 2200/0069* (2013.01);
(Continued)

(58) Field of Classification Search
None
See application file for complete search history.

(56) References Cited

U.S. PATENT DOCUMENTS 6,991,578 B2    1/2006   Ziemer
7,086,986 B2    8/2006   Raghavan et al.
(Continued)

FOREIGN PATENT DOCUMENTS

JP    2010 060096    3/2010

OTHER PUBLICATIONS

German Search Report, Jul. 16, 2013.
PCT Search Report, Jan. 29, 2014.

*Primary Examiner* — Erin D Bishop
*Assistant Examiner* — Lori Wu
(74) *Attorney, Agent, or Firm* — Dority & Manning, P.A.

(57) ABSTRACT

A transmission includes a drive shaft, an output shaft, a housing, and a first through third planetary gear sets. Six shift elements include a first brake, a second brake, and first through fourth clutches. The shift elements are selectively actuated, by which ten forward gears and one reverse gear can be. Each planetary gear set features at least one sun gear, one planetary gear, one planetary carrier and one ring gear. The drive shaft and the output shaft are arranged in a manner axially offset to each other. The drive shaft is connectable to the sun gear of the third planetary gear set and the second brake through the first clutch, and is connectable to the planetary carrier of the third planetary gear set through the second clutch. The planetary carrier of the third planetary gear set is connected to the first brake.

26 Claims, 8 Drawing Sheets

(52) U.S. Cl.
CPC .............. *F16H 2200/201* (2013.01); *F16H 2200/2046* (2013.01); *F16H 2200/2094* (2013.01)

(56) References Cited

U.S. PATENT DOCUMENTS

| | | | | |
|---|---|---|---|---|
| 7,686,732 | B2* | 3/2010 | Raghavan | F16H 3/66 475/278 |
| 7,828,688 | B2 | 11/2010 | Phillips et al. | |
| 8,303,454 | B1* | 11/2012 | Shim | F16H 3/66 475/280 |
| 2005/0215379 | A1 | 9/2005 | Usoro et al. | |
| 2006/0142112 | A1* | 6/2006 | Kamada | F16H 3/663 475/275 |
| 2009/0215580 | A1* | 8/2009 | Hart | F16H 3/666 475/276 |
| 2009/0270219 | A1* | 10/2009 | Kim | F16H 3/663 475/276 |
| 2009/0298639 | A1* | 12/2009 | Kim | F16H 3/663 475/275 |
| 2009/0305837 | A1 | 12/2009 | Haraiwa | |
| 2010/0035718 | A1 | 2/2010 | Saitoh | |
| 2012/0088626 | A1* | 4/2012 | Phillips | F16H 3/66 475/275 |
| 2013/0072343 | A1* | 3/2013 | Shim | F16H 3/66 475/276 |

\* cited by examiner

| Gang (gear) | geschlossene Schaltelemente (engaged shifting elements) ||||||  Über- setzung (ratio) | Gang- sprung (step) |
|---|---|---|---|---|---|---|---|---|
| | Bremse (brake) || Kupplung (cluttch) ||||| |
| | B1 | B2 | K1 | K2 | K3 | K4 | i | φ |
| 1 | × | | × | | × | | 5,444 | |
| | | | | | | | | 1,416 |
| 2 | × | × | | | × | | 3,845 | |
| | | | | | | | | 1,291 |
| 3 | × | | | | × | × | 2,979 | |
| | | | | | | | | 1,530 |
| 4 | | × | | | × | × | 1,947 | |
| | | | | | | | | 1,350 |
| 5 | | | × | | × | × | 1,442 | |
| | | | | | | | | 1,310 |
| 6 | | | | × | × | × | 1,101 | |
| | | | | | | | | 1,101 |
| 7 | | | × | × | × | | 1,000 | |
| | | | | | | | | 1,076 |
| 8 | | × | | × | × | | 0,929 | |
| | | | | | | | | 1,221 |
| 9 | | | × | × | | × | 0,761 | |
| | | | | | | | | 1,258 |
| 10 | | × | | × | | × | 0,605 | |
| R | × | | × | | | × | -2,947 | Gesamt (total) 9,003 |

Fig. 8

TRANSMISSION FOR USE IN A MOTOR VEHICLE

FIELD OF THE INVENTION

The present invention relates to a transmission, in particular for use in motor vehicles.

BACKGROUND

Here, a transmission in particular designates a multi-gear transmission, with a predefined number of gears and fixed transmission ratio relationships between transmission input and transmission output, which is automatically shiftable through shift elements. Here, the shift elements comprise, for example, clutches or brakes.

DE 10 2008 032 015 discloses a powershift transmission with ten forward gears and one reverse gear. Thereby, the powershift transmission features three planetary gear sets, which are able to be shifted with each other in various combinations through six torque-transferring devices, two of which are fixed connections and four of which are clutches. A torque is initiated through a start-up element in the powershift transmission, and is transferred to an output element while taking into account the respective transmission ratio relationship. Thereby, the drive element and the output element are arranged coaxially to each other.

SUMMARY OF THE INVENTION

The present invention is subject to a task of proposing a transmission of the aforementioned type, which features small gear steps with a large gear spread, which at the same type optimizes installation space and/or features a high degree of efficiency. Additional objects and advantages of the invention will be set forth in part in the following description, or may be obvious from the description, or may be learned through practice of the invention.

A "gear spread" is understood to mean the quotient from the transmission ratio relationship of the lowest gear and the transmission ratio relationship of the highest gear, whereas the lowest gear features the largest transmission ratio relationship, and the highest gear features the smallest transmission ratio relationship. If there is a transmission ratio relationship of i<1.0, a transmission ratio into fast mode takes place; that is, at the transmission output, a higher rotational speed than that at the transmission input is applied.

In accordance with the invention, the tasks are solved with a transmission as described and claimed herein.

The transmission comprises at least one drive shaft, one output shaft, one housing, and six shift elements. It is particularly preferable that, through the drive shaft, a torque or a rotational movement of a drive source, such as an internal combustion engine, is initiated in the transmission. In a preferred manner, a start-up element, such as a hydrodynamic torque converter or a fluid coupling, is located between the drive source and the drive shaft.

In the following, a "shaft" is not solely understood as an exemplary cylindrical, rotatably mounted machine element for the transfer of torques, but is also understood as a general connection element, which connects individual components or elements to each other, in particular connection elements that connect several elements to each other in a torque-proof manner.

In particular, two elements are described as connected to each other if there is a fixed (in particular, a torque-proof) connection between the elements. In particular, such connected elements rotate with the same rotational speed.

Furthermore, two elements are described as connectable if there is a detachably torque-proof connection between such elements. In particular, such elements rotate if the connection exists with the same rotational speed.

The various components and elements of the specified invention may be connected to each other through a shaft or a connection element, or also directly, for example by means of a welded connection, crimping connection or another connection.

It is particularly preferable that the six shift elements comprise a first brake, a second brake, a first clutch, a second clutch, a third clutch, and a fourth clutch.

Thereby, clutches describe shift elements that, depending on their operating state, allow for a relative movement between two components or represent a connection for the transfer of a torque. A "relative motion" is understood as, for example, a rotation of two components, where the rotational speed of the first component and the rotational speed of the second component differ from each other. In addition, the rotation of only one of the two components is conceivable, while the other component is at a standstill or rotates in the opposite direction.

In the following, a "non-actuated clutch" is understood as an open clutch. This means that a relative motion between the two components is possible. With an actuated or locked clutch, the two components rotate accordingly with the same rotational speed and in the same direction.

A "brake" is understood as a shift element that is connected on one side to a fixed element, such as a housing, and on another side to a rotating element. In the following, a "non-actuated brake" is understood as an open brake. This means that the rotating component is in free-running mode, which means that the brake preferably does not affect the rotational speed of the rotating component. With an actuated or locked break, a reduction of the rotational speed of the rotating component up to a stop takes place, which means that a connection between the rotating element and the fixed element can be established.

As a general rule, the use of shift elements that are locked in a non-actuated state and open in an actuated state is also possible. Accordingly, the allocations between function and shifting state of the shifting states described above are understood in reverse order. With the following embodiments, an arrangement in which an actuated shift element is closed and a non-actuated shift element is open is initially used as the basis.

The transmission also comprises a first planetary gear set, a second planetary gear set, and a third planetary gear set.

Thereby, a planetary gear set comprises one sun gear, one planetary carrier, and one ring gear. Planetary gears that mesh with the toothing of the sun gear and/or with the toothing of the ring gear are rotatably mounted on the planetary carrier.

In the following, a negative planetary gear set describes an individual planetary gear set with a planetary carrier on which the planetary gears are rotatably mounted, with one sun gear and one ring gear, whereas the toothing of at least one of the planetary gears meshes with both the toothing of the sun gear and with the toothing of the ring gear, by which the ring gear and the sun gear rotate in opposite directions, if the sun gear rotates with a fixed planetary carrier.

A positive planetary gear set differs from the negative planetary gear set just described in that the positive planetary gear set features inner and outer planetary gears, which are rotatably mounted on the planetary carrier. Thereby, the toothing of the inner planetary gears meshes, on the one hand, with the toothing of the sun gear and, on the other hand, with the toothing of the outer planetary gears. The toothing of the outer planetary gears also meshes with the toothing of the ring gear. This has the consequence that, with a fixed planetary carrier, the ring gear and the sun gear rotate in the same direction of rotation.

A particularly compact transmission can be realized through the use of planetary gear sets, by which a high degree of freedom in the arrangement of the transmission in the vehicle is achieved.

In particular, the sun gear, the ring gear, the planetary carrier and the planetary gears of the planetary gear set are understood as elements of a planetary gear set.

It is particularly preferable that the shift elements are able to be actuated selectively, thus individually and in line with demand, by which ten forward (vehicle direction) gears and one reverse (vehicle direction) gear can be realized through different transmission ratio relationships between the drive shaft and the output shaft. Based on the numerous gears, it is possible to realize a fine gear shifting with a large gear spread, and thereby, for example, to operate the internal combustion engine in an optimal rotational speed range, and thus efficiently. At the same time, this contributes to increased driving comfort, since the internal combustion engine preferably can be operated at a low rotational speed level. Thus, for example, noise emissions that arise through the operation of the internal combustion engine are reduced.

It is also preferable that the drive shaft and the output shaft are arranged in a manner axially offset (i.e., the axes are offset) to each other. This leads, for example, to a particularly low need for axial installation space for the transmission. Thereby, the transmission is suitable, in a particularly preferable manner, for use in a vehicle with a front-transverse arrangement of the drive train.

"Front-transverse arrangement of the drive train" is understood to mean that the drive source, such as an internal combustion engine, is installed in the vehicle transverse to the direction of travel, and that, preferably, the wheels of the front axle are drivable by the drive source or the transmission.

In the following, "connectable" is understood to mean that a detachable connection can be established between two elements. For example, this means that it is preferable that, through shift elements, depending on their operating state, there is a torque-proof connection between two elements for the transfer of rotational movement, or that the two elements are rotationally decoupled from each other. In this case, a transfer of a rotational movement does not take place.

In contrast to this, "connected" is understood to mean that a permanent fixed connection between two elements exists, by which, for example, a rotational movement is constantly transferable from the one element to the other element.

It is also preferable that the drive shaft of the first clutch is connectable to the sun gear of the third planetary gear set and the second brake. It is also preferable that the drive shaft is connectable to the planetary carrier of the third planetary gear set through the second clutch, whereas the planetary carrier of the third planetary gear set is also connectable to the first brake. This achieves a multitude of degrees of freedom with respect to the planetary gear sets, such that a multitude of gears with the use of relatively few shift elements and planetary gear sets is feasible.

It is particularly preferable that the three planetary gear sets, beginning at the transmission input in the order of first planetary gear set, second planetary gear set, third planetary gear set, are arranged coaxially to the drive shaft. In addition, it is particularly preferable that the shift elements are arranged so that they are easily accessible from the outside.

The degree of efficiency of the transmission may be preferably increased by the fact that, for the shift elements, energy is necessary for the change to the shifting state, but not for maintaining the shifting state itself. Here, actuated shift elements in line with demand, such as electromechanical shift elements or electromagnetic shift elements, are suitable in a particular way. Particularly when compared to conventional hydraulically actuated shift elements, they are characterized by a particularly low and efficient energy demand, since they can be operated nearly loss-free. In addition, with the solution specified above, it is advantageous that permanently holding a control pressure for the actuation of the (for example) conventional hydraulic shift elements, and/or permanently applying the shift element in the locked state with the required hydraulic pressure, can be avoided. Thereby, additional components such as a hydraulic pump (for example) may be omitted, to the extent that they are solely used for the control and supply of conventional hydraulically actuated shift elements. If the additional components are supplied with lubricant by the same hydraulic pump, and not by a separate lubrication pump, at least this can be dimensioned smaller. Moreover, any leaks at the oil transfer points of the hydraulic circuit that may arise, particularly with rotating components, are eliminated. It is particularly preferable that this also contributes to increased efficiency of the transmission in the form of a higher degree of efficiency. Upon the use of actuated shift elements in line with demand of the type specified above, it is particularly advantageous if they are easily accessible from the outside. Among other things, that has the advantage that the required shifting energy can be easily fed to the shift elements. Therefore, the shift elements are, particularly preferably, arranged so that they are easily accessible from the outside. Within the meaning of the shift elements, "easily accessible from the outside" means that no additional components are arranged between the housing and the shift element, and/or that the shift elements are, particularly preferably, arranged on the output shaft or on the drive shaft.

A transmission input thereby describes a location on a transmission at which, in driving mode, a torque is initiated by the drive source in the transmission. In contrast to this, a "transmission output" is understood to mean a location on the transmission at which the torque, taking into account the corresponding transmission ratio relationships (for example, in a transfer case) is initiated or transferred to the drive shafts of the vehicle.

In an additional preferred embodiment, the transmission features a first spur gear set and a second spur gear set. Through the first spur gear set and/or the second spur gear set, a torque or a rotational movement is transferable between the drive shaft and the output shaft, depending on the actuation of the shift elements. Thereby, it is particularly preferable that the shift elements, spur gear sets and planetary gear sets are arranged along the shaft, beginning at the transmission input, in the order of first clutch, second clutch, third clutch, first spur gear set, second spur gear set, first planetary gear set, second planetary gear set, third planetary gear set, first brake, second brake. The fourth clutch is arranged coaxially to the output shaft at an end of the output shaft opposite to the transmission output. Thereby, the transmission output and the transmission input point in the same direction. Through this arrangement, the transmission is suitable, in a particularly preferable manner, for use in vehicles with a front-transverse arrangement of the drive train, since a lower need for axial installation space is required by the axially offset arrangement of the drive shaft and the output shaft. This is of particular importance for vehicles with a front-transverse arrangement of the drive train, since the available installation space for the drive source and the transmission is, in a particular manner, limited by the width of the vehicle. However, other arrangements of the drive train (for example, for rear-wheel drive vehicles) are conceivable. The fact that, with this arrangement, the individual planetary gear sets and shift elements can be easily nested in one another also contributes to a particularly space-saving embodiment. The space-saving arrangement can be realized, since, in the specified arrangement (for example), the various shafts do not cross each other.

To the extent that this allows for the binding ability of the elements, a geometric positioning of the individual gear sets, shift elements and spur gear sets that deviate from the arrangement just described is conceivable, to the extent that the change to the geometric positioning of the components occurs along the drive shaft. At least each one spur gear of the first spur gear set and one spur gear of the second spur gear set are arranged coaxially to the drive shaft.

A spur gear set comprises a single-stage or multi-stage spur gearbox with at least two spur gears, which mesh with each other. Thereby, the respective shafts of the spur gears and/or the rotation axes of the shafts and spur gears are arranged parallel to each other.

"Binding ability" is understood to mean that, with a different geometric positioning, thus an arrangement of components that deviates from the arrangement just described, the same binding or connection of the interfaces is ensured, without the individual connection elements or shafts crossing each other.

Moreover, the use of a chain drive or a belt in place of the first spur gear set or the second spur gear set is conceivable. Thereby, under certain circumstances, it must be taken into account that, when comparing a spur gear set with a chain drive or a belt drive, a reversal of direction of the rotational movement takes place and, to the extent necessary, must be corrected.

It is also preferable that each of the first planetary gear set, the second planetary gear set, and the third planetary gear set is designed as a negative planetary gear set. In a particular manner, this arrangement proves to be a cost-effective option for realization. At the same time, this arrangement features a high degree of efficiency with respect to the gear set. To the extent allowed by the binding ability, as an alternative embodiment, at least one negative planetary gear set may be converted into a positive planetary gear set. However, at the same time, this requires that the planetary carrier connection and the ring gear connection are exchanged, and the amount of the stationary transmission ratio is increased by the value of 1.

Thereby, the stationary transmission ratio indicates the transmission ratio relationship between the sun gear and the ring gear, if the planetary carrier is fixed.

It is particularly preferable that all elements of the first planetary gear set, the second planetary gear set, and the third planetary gear set are rotatable. This means that there is no permanent connection between the elements of the planetary gear sets and a fixed element, such as the housing; rather, a connection can be selectively established through the actuation of the shift elements. Thereby, a blocking of the individual elements of the planetary gear sets can be produced only through the actuation of the respective shift elements. This also advantageously contributes to the fact that, by means of a low number of planetary gear sets, a high number of gears can be realized.

It is particularly preferable that the first clutch, the second clutch, the third clutch, the first brake, and the second brake are arranged coaxially to the drive shaft. In addition, the fourth clutch is preferably arranged coaxially to the output shaft. Through this arrangement, it is particularly preferable that the shift elements are easily accessible from the outside, and, at the same time, the various shift elements or planetary gear sets can be easily nested in one another. This has the consequence that there is a particularly low need for installation space.

In an additional preferred form of the arrangement, the first clutch, the second clutch, the first brake and the second brake are arranged coaxially to the drive shaft. The third clutch and the fourth clutch are preferably arranged coaxially to the output shaft. This arrangement also results in a particularly low need for installation space.

In an additional preferred embodiment, the first clutch, the second clutch, the third clutch, the fourth clutch, the first brake and the second brake are arranged coaxially to the drive shaft. Here, it is once again particularly preferable that all shift elements are easily accessible from the outside, the elements of the planetary gear set can be easily nested in one another and, thus, a low need for installation space once again arises.

In an additional preferred form of the arrangement, the drive shaft is connectable to the ring gear of the second planetary gear set through the second clutch. It is also preferable that the drive shaft is connectable to the sun gear of the first planetary gear set through the third clutch. The planetary carrier of the first planetary gear set is connected to a first spur gear set, and the first spur gear set is further connected to the output shaft. It is also preferable that the planetary carrier of the second planetary gear set is connected to the ring gear of the first planetary gear set. The sun gear of the second planetary gear set is preferably connected to the ring gear of the third planetary gear set and to a second spur gear set, whereas the second spur gear set is connectable to the output shaft through the fourth clutch.

It is particularly preferable that the drive shaft is connected to the sun gear of the first planetary gear set and is connectable to the ring gear of the second planetary gear set through the second clutch. The planetary carrier of the first planetary gear set is preferably connectable to a first spur gear set through the third clutch, whereas the first spur gear set is further connected to the output shaft. It is also preferable that the planetary carrier of the second planetary gear set is connected to the ring gear of the first planetary gear set. The sun gear of the second planetary gear set is preferably connected to the ring gear of the third planetary gear set and a second spur gear set, whereas the second spur gear set is connectable to the output shaft through the fourth clutch.

In an additional preferred embodiment, the drive shaft is connected to the sun gear of the first planetary gear set and is connectable to the ring gear of the second planetary gear set through the second clutch. The planetary carrier of the first planetary gear set is preferably connected to a first spur gear set, whereas the first spur gear set is connectable to the output shaft through the third clutch. It is also preferable that the planetary carrier of the second planetary gear set is connected to the ring gear of the first planetary gear set. The sun gear of the second planetary gear set is preferably connected to the ring gear of the third planetary gear set and a second spur gear set, whereas the second spur gear set is connectable to the output shaft through the fourth clutch.

In an additional preferred embodiment, the drive shaft is connectable to the ring gear of the second planetary gear set through the second clutch and is connected to the sun gear of the first planetary gear set. Preferably, the planetary carrier of the first planetary gear set is connected to a first spur gear set, and the first spur gear set is further connected to the output shaft. The planetary carrier of the second planetary gear set is preferably connectable to the ring gear of the first planetary gear set through the third clutch. Preferably, the sun gear of the second planetary gear set is connected to the ring gear of the third planetary gear set and a second spur gear set, whereas the second spur gear set is connectable to the output shaft through the fourth clutch.

In an additional preferred embodiment, the drive shaft is connectable to the ring gear of the second planetary gear set through the second clutch, and is connected to the sun gear of the first planetary gear set. It is also preferable that the planetary carrier of the first planetary gear set is connected to a first spur gear set, and the first spur gear set is further connected to the output shaft. The planetary carrier of the second planetary gear set is preferably connected to the ring gear of the first planetary gear set. It is also preferable that the sun gear of the second planetary gear set is connectable to the ring gear of the third planetary gear set and a second spur gear set through the third clutch, whereas the second spur gear set is connectable to the output shaft through the fourth clutch.

In an additional preferred form of the arrangement, the drive shaft is connectable to the ring gear of the second planetary gear set through the second clutch and the third clutch. It is further preferable that the drive shaft is connected to the sun gear of the first planetary gear set. The planetary carrier of the first planetary gear set is preferably connected to a first spur gear set, and the first spur gear set is further connected to the output shaft. It is also preferable that the planetary carrier of the second planetary gear set is connected to the ring gear of the first planetary gear set. The sun gear of the second planetary gear set is preferably connected to the ring gear of the third planetary gear set and a second spur gear set, whereas the second spur gear set is connectable to the output shaft through the fourth clutch.

In an additional preferred embodiment, the drive shaft is connectable to the ring gear of the second planetary gear set through the second clutch, and is connectable to the sun gear of the first planetary gear set through the third clutch. The planetary carrier of the first planetary gear set is preferably connected to a first spur gear set, whereas the first spur gear set is further connected to the output shaft. It is also preferable that the planetary carrier of the second planetary gear set is connected to the ring gear of the first planetary gear set. The sun gear of the second planetary gear set is preferably connected to the ring gear of the third planetary gear set and is connectable to a second spur gear set through the fourth clutch, whereas the second spur gear set is further connected to the output shaft.

Particularly preferably, the first forward gear can be represented by the locked first brake, the locked first clutch and the locked third clutch. The second forward gear preferably can be represented by the locked first brake, the locked second brake and the locked third clutch. The third forward gear preferably can be represented by the locked first brake, the locked third clutch and the locked fourth clutch. It is particularly preferable that the fourth forward gear can be represented by the locked second brake, the locked third clutch and the locked fourth clutch. The fifth forward gear preferably can be represented by the locked first clutch, the locked third clutch and the locked fourth clutch. The sixth forward gear preferably can be represented by the locked second clutch, the locked third clutch and the locked fourth clutch. The seventh forward gear preferably can be represented by the locked first clutch, the locked second clutch and the locked third clutch. The eighth forward gear preferably can be represented by the locked second brake, the locked second clutch and the locked third clutch. The ninth forward gear preferably can be represented by the locked first clutch, the locked second clutch and the locked fourth clutch. The tenth forward gear preferably can be represented by the locked second brake, the locked second clutch and the locked fourth clutch. The reverse gear preferably can be represented by the locked first brake, the locked first clutch and the locked fourth clutch. Each of the non-locked shift elements of the corresponding forward gear or reverse gear is, unless otherwise mentioned, open.

In accordance with an additional aspect of the present invention, a method for operating the transmission is proposed. Thereby, ten forward gears can be preferably selected in such a manner that, in each gear, three shift elements are locked and the remaining shift elements are open. Regardless of whether they are able to be actuated hydraulically, electro-mechanically or in any other way, this leads to a lower need for energy of the shift elements, which ultimately has advantageous effects on consumption, for example the consumption of fuel if an internal combustion engine is the drive source of the vehicle. A gear change to an adjacent higher gear or to an adjacent lower gear can be realized by closing at least one previously open shift element and by opening at least one previously locked shift element.

The geometric positioning of the individual gear sets and shift elements is freely selectable, as long as this allows for the binding ability of the elements. This means that the individual elements may be arbitrarily moved into their position in the housing, as long as the individual connection elements or shafts do not cross each other. This also means that the planetary gear sets may be arranged radially above one another or axially behind one another along, for example, the drive shaft.

In principle, all shift elements can function in a frictional-locking or positive-locking manner. Primarily, the first brake and the third clutch are, in a particular manner, suitable for the use of a claw shift element. This leads to a significantly improved degree of efficiency, and thus to significant consumption advantages with respect to fuel consumption, for example, for vehicles with internal combustion engines.

In principle, on each shaft or each connection element, an electric motor or another power/drive source may also be arranged.

In addition, at each shaft, a freewheel may in principle be arranged at the housing or at another shaft. As a result, the corresponding shift element may be dimensioned smaller, since at least part of the torque is captured through the freewheel.

BRIEF DESCRIPTION OF THE DRAWINGS

The invention is described more specifically by example on the basis of the attached figures. The following is shown:

FIG. 8 is an exemplary shifting diagram for a transmission in accordance with FIGS. 1 to 7.

DETAILED DESCRIPTION

Figure 1:
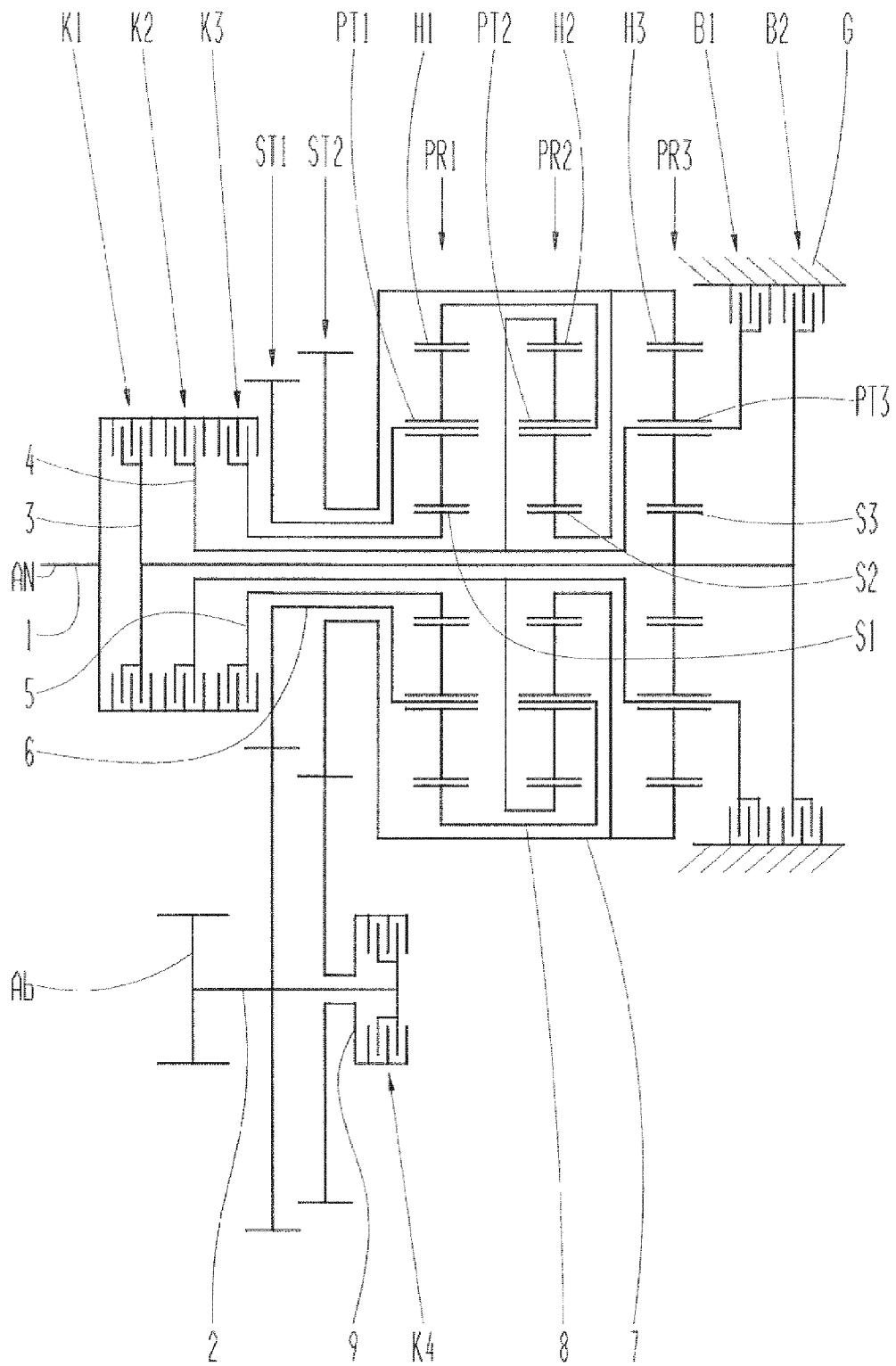
FIG. 1 is a schematic view of a first preferred embodiment of a transmission in accordance with the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In a schematic presentation, FIG. 1 shows a first preferred embodiment of the transmission, whereas the transmission comprises a first planetary gear set PR1, a second planetary gear set PR2, a third planetary gear set PR3, a first spur gear set ST1, a second spur gear set ST2, and six shift elements. Thereby, all of the specified elements are arranged in a housing G. The six shift elements comprise a first brake B1, a second brake B2, a first clutch K1, a second clutch K2, a third clutch K3, and a fourth clutch K4. Thereby, the first clutch K1, the second clutch K2, the third clutch K3, the first planetary gear set PR1, the second planetary gear set PR2, the third planetary gear set PR3, the first brake B1, and the second brake B2 are arranged coaxially to a drive shaft 1 at the transmission input AN, in the specified order. Furthermore, the first spur gear set ST1 and the second spur gear set ST2 are located between the third clutch K3 and the first planetary gear set PR1, whereas at least one spur gear of the first spur gear set ST1 and one spur gear of the second spur gear set ST2 are arranged coaxially to the drive shaft 1. An output (Ab) shaft 2 is located in parallel arrangement to the drive shaft 1. On one side, the drive shaft 1 is connected to each of the first clutch K1, the second clutch K2 and third clutch K3, while a free end of the drive shaft 1 protrudes from the housing G. On one side, the output shaft 2 is connected to the fourth clutch K4, the second spur gear set ST2 and the first spur gear set ST1. On the side of the output shaft 2 opposite to the fourth clutch K4, the output shaft 2 protrudes from the housing G with a free end. Thereby, the free end of the drive shaft 1 and the free end of the output shaft 2 point in the same direction. The first spur gear set ST1, the second spur gear set ST2 and the fourth clutch K4 are arranged along the output shaft 2 beginning at the free end of the output shaft 2, in the order of first spur gear set ST1, second spur gear set ST2, fourth clutch K4. In each case, one additional spur gear of the first spur gear set ST1 and one additional spur gear of the second spur gear set ST2 are arranged coaxially to the output shaft 2. The first brake B1 and the second brake B2 are connected to the housing G on one side.

The first planetary gear set PR1 consists of one sun gear S1, one planetary carrier PT1 and one ring gear H1. The second planetary gear set PR2 comprises one sun gear S2, one planetary carrier PT2 and one ring gear H2. The third planetary gear set PR3 comprises one sun gear S3, one planetary carrier PT3 and one ring gear H3.

The drive shaft 1 is connectable to a third shaft 3 through the first clutch K1, whereas the third shaft 3 further connects the second brake B2 to the sun gear S3 of the third planetary gear set PR3. In addition, the drive shaft 1 is connectable to a fourth shaft 4 through the second clutch K2, whereas the fourth shaft 4 further connects the ring gear H2 of the second planetary gear set PR2 to the planetary carrier PT3 of the third planetary gear set PR3. The fourth shaft 4 further connects the planetary carrier PT3 of the third planetary gear set PR3 to the first brake B1. Through the third clutch K3, the drive shaft 1 is connectable to a fifth shaft 5, whereas the fifth shaft 5 is further connected to the sun gear S1 of the first planetary gear set PR1. The planetary carrier PT1 of the first planetary gear set PR1 is connected to the first spur gear set ST1 through a sixth shaft 6, whereas the first spur gear set ST1 is further connected to the output shaft 2. The planetary carrier PT2 of the second planetary gear set PR2 is connected to the ring gear H1 of the first planetary gear set PR1 through an eighth shaft 8. The sun gear S2 of the second planetary gear set PR2 is connected to the ring gear H3 of the third planetary gear set PR3 through a seventh shaft 7. The seventh shaft 7 further connects the ring gear H3 of the third planetary gear set PR3 to the second spur gear set ST2. The second spur gear set ST2 is further connected to a ninth shaft 9, whereas the ninth shaft 9 is connectable to the output shaft 2 through the fourth clutch K4.

Figure 2:
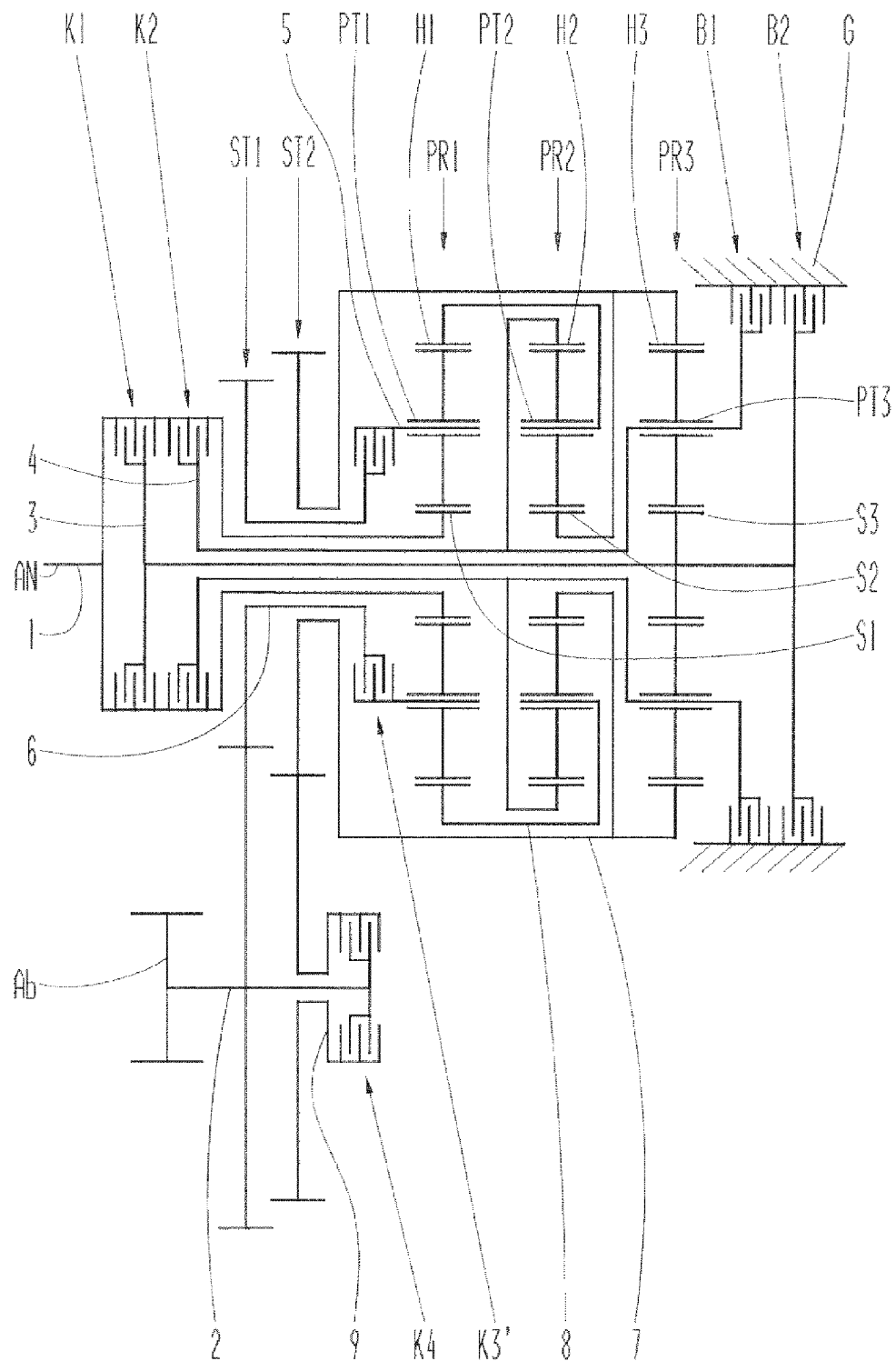
FIG. 2 is a schematic view of a second preferred embodiment of a transmission in accordance with the invention.

FIG. 2 shows an additional form of the arrangement of the transmission described in FIG. 1. A significant difference with the embodiment described in FIG. 1 consists of the fact that the third clutch K3' is arranged between the second spur gear set ST2 and the first planetary gear set PR1 in a coaxial position to the drive shaft 1. This results in some changes with respect to the interfaces, which are described below. The drive shaft 1 is now directly connected to the sun gear S1 of the first planetary gear set PR1, The planetary carrier PT1 of the first planetary gear set PR1 is connected to the fifth shaft 5, whereas the fifth shaft 5 of the third clutch K3' is connectable to the sixth shaft 6, and the sixth shaft 6 is further connected to the first spur gear set ST1. The first spur gear set ST1 is further connected to the output shaft 2. All additional interfaces and the arrangement of the respective components correspond to the arrangement described in FIG. 1.

Figure 3:
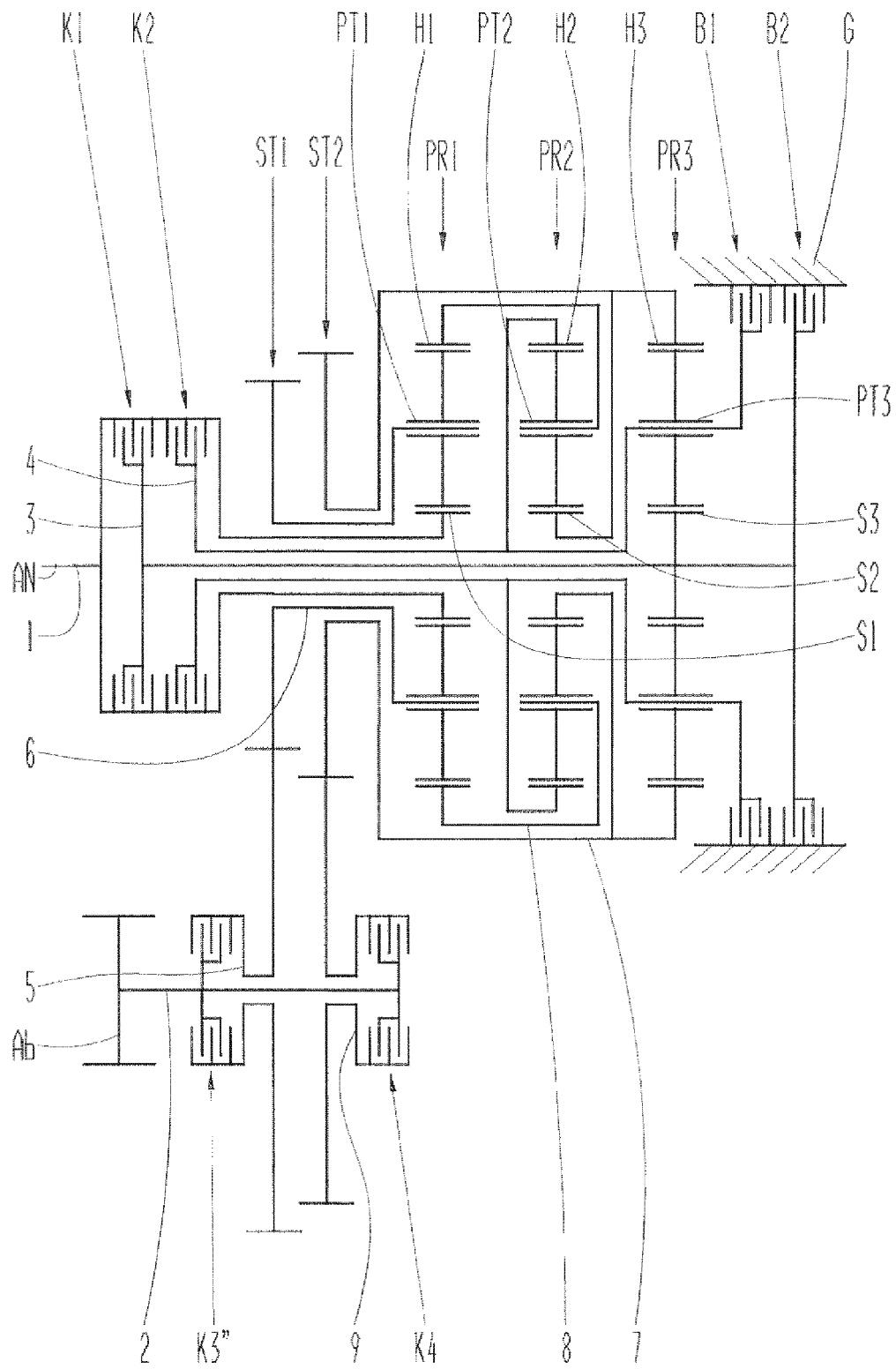
FIG. 3 is a schematic view of a third preferred embodiment of a transmission in accordance with the invention.

FIG. 3 shows an additional variant of the transmission described in FIG. 1. Moreover, FIG. 3 essentially differs from the embodiment described in FIG. 1 by the arrangement of the third clutch K3" and the different interfaces that result from this. The following addresses the differences with the arrangement described in FIG. 1. In FIG. 3, the third clutch K3" is arranged coaxially to the output shaft 2. Thereby, beginning at the end of the output shaft 2, which protrudes from the housing G, the third clutch K3", the first spur gear set ST1, the second spur gear set ST2 and the fourth clutch K4 are located in the order just specified. In contrast to the arrangement described in FIG. 1, in the embodiment shown in FIG. 3, the drive shaft 1 is directly connected to the sun gear S1 of the first planetary gear set PR1. The planetary carrier PT1 of the first planetary gear set PR1 is indeed, as described in FIG. 1, connected to the first spur gear set ST1 through the sixth shaft 6, but the first spur gear set ST1 is now further connected to the fifth shaft 5, which is connectable to the output shaft 2 through the third clutch K3". The first clutch K1, the second clutch K2, the third clutch K3" and the fourth clutch K4 are arranged in such a manner that no additional shafts or connection elements are arranged between the specified shift elements and the housing G. Thereby, the specified shift elements are particularly easily accessible from the outside. All other interfaces and component arrangements correspond to the arrangement described in FIG. 1.

Figure 4:
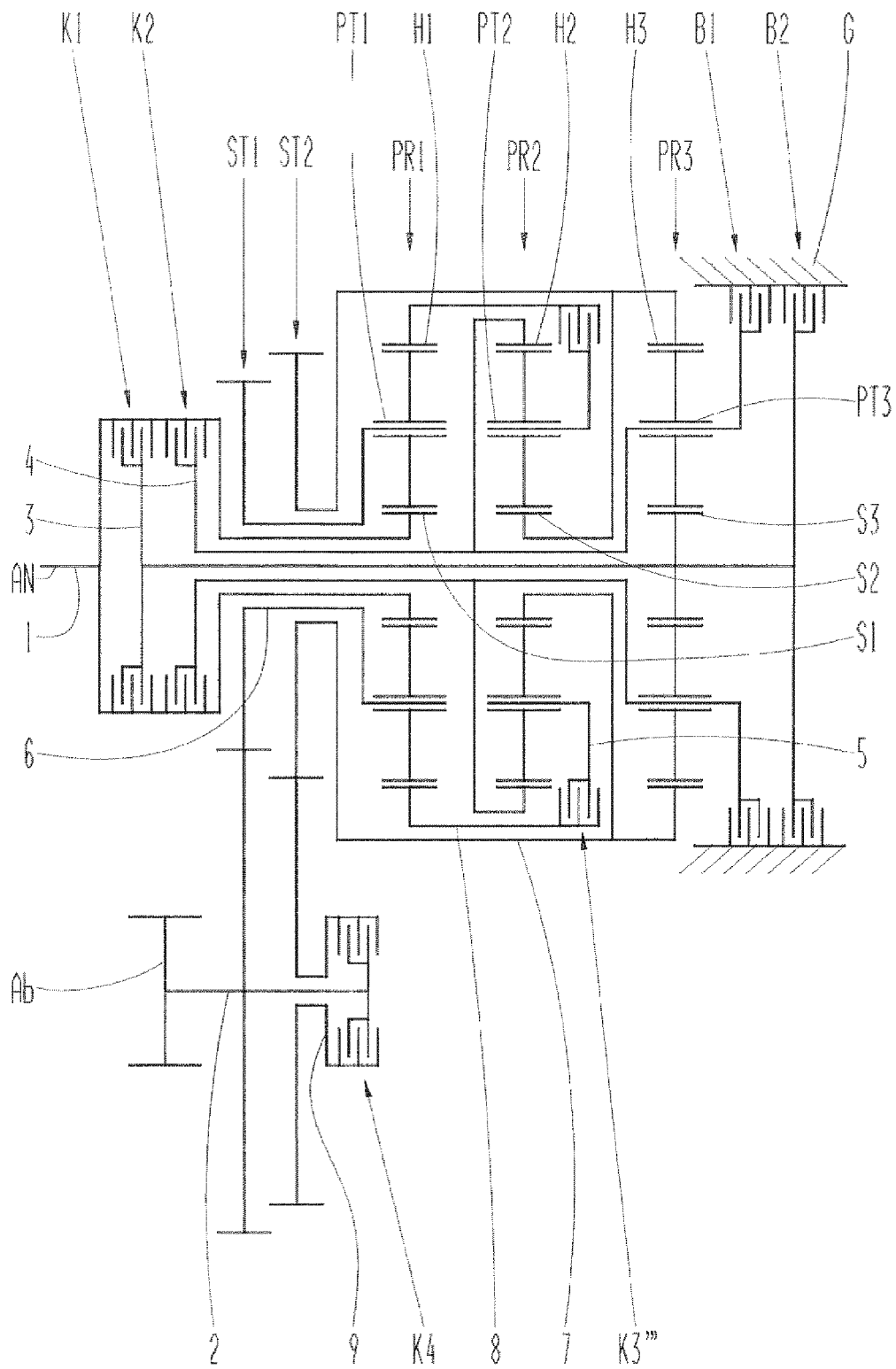
FIG. 4 is a schematic view of a fourth preferred embodiment of a transmission in accordance with the invention.

FIG. 4 schematically represents a fourth embodiment of the transmission described in FIG. 1. The embodiment of the transmission shown in FIG. 4 significantly differs from that of the embodiment described in FIG. 1 in the arrangement of the third clutch K3'''. The following more specifically addresses the resulting differences in the positioning of the individual components and the respective interfaces. In the embodiment shown in FIG. 4, the third clutch K3''' is arranged coaxially to the drive shaft 1 between the second planetary gear set PR2 and the third planetary gear set PR3. Further, the drive shaft 1 is now directly connected to the sun gear S1 of the first planetary gear set PR1. Further, the planetary carrier PT2 of the second planetary gear set PR2 is now connected to the fifth shaft 5, whereas the fifth shaft 5 is connectable to the eighth shaft 8 through the third clutch K3''', and the eighth shaft 8 is further connected to the ring gear H1 of the first planetary gear set PR1. There are no additional shafts or connection elements between the first clutch K1, the second clutch K2 and the fourth clutch K4, by which the specified shift elements are particularly easily accessible from the outside. All additional interfaces and component arrangements correspond to the arrangement described in FIG. 1.

Figure 5:
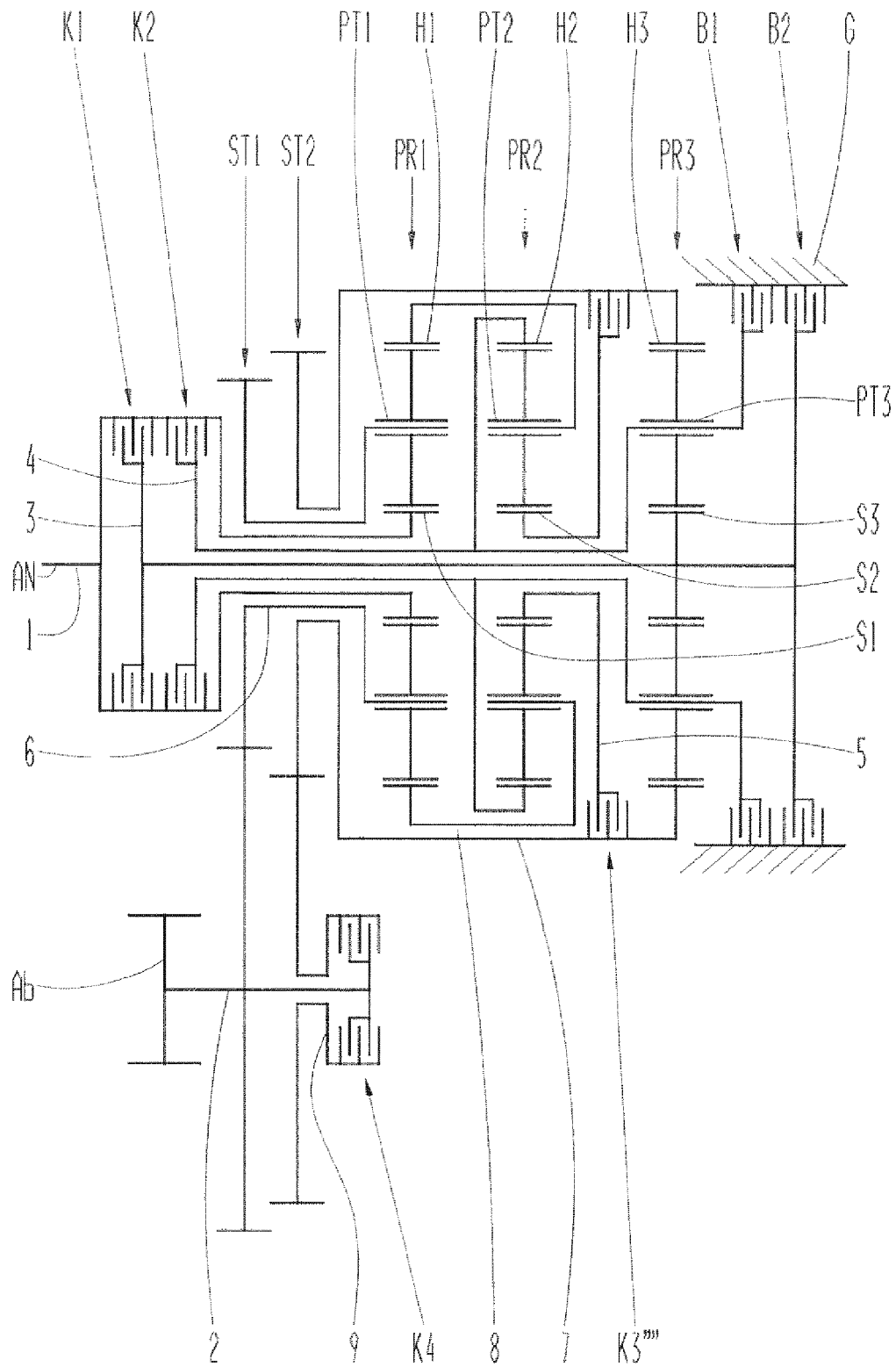
FIG. 5 is a schematic view of a fifth preferred embodiment of a transmission in accordance with the invention.

FIG. 5 shows a fifth embodiment of the transmission described in FIG. 1. The arrangement of the embodiment shown in FIG. 5 differs significantly from the embodiment shown in FIG. 1 in the arrangement of the third clutch K3''''. Due to the different arrangement of the third clutch K3''', some interfaces differ from the arrangement described in FIG. 1, which is why the following addresses the differences. The third clutch K3'''' is positioned in a coaxial arrangement to the drive shaft 1 between the second planetary gear set PR2 and the third planetary gear set PR3. Among other things, this has the consequence that the drive shaft 1 is directly connected to the sun gear S1 of the first planetary gear set PR1. In contrast to the arrangement described in FIG. 1, the sun gear S2 of the second planetary gear set PR2 is now connected to the fifth shaft 5, whereas the fifth shaft 5 is further connectable to the seventh shaft 7 through the third clutch K3''''. The seventh shaft 7 also further connects the ring gear H3 of the third planetary gear set PR3 to the second spur gear set ST2. The second spur gear set ST2 is further connected to the ninth shaft 9, whereas the ninth shaft 9 is connectable to the output shaft 2 through the fourth clutch K4. In the schematic presentation of the transmission shown in FIG. 5, there are no additional connection elements or shafts between the first clutch K1, the second clutch K2, the third clutch K3'''' and the fourth clutch K4 and the housing G, which has the consequence that the specified shift elements are easily accessible from the outside. All additional interfaces and arrangements of the components or elements correspond to the arrangement described in FIG. 1.

Figure 6:
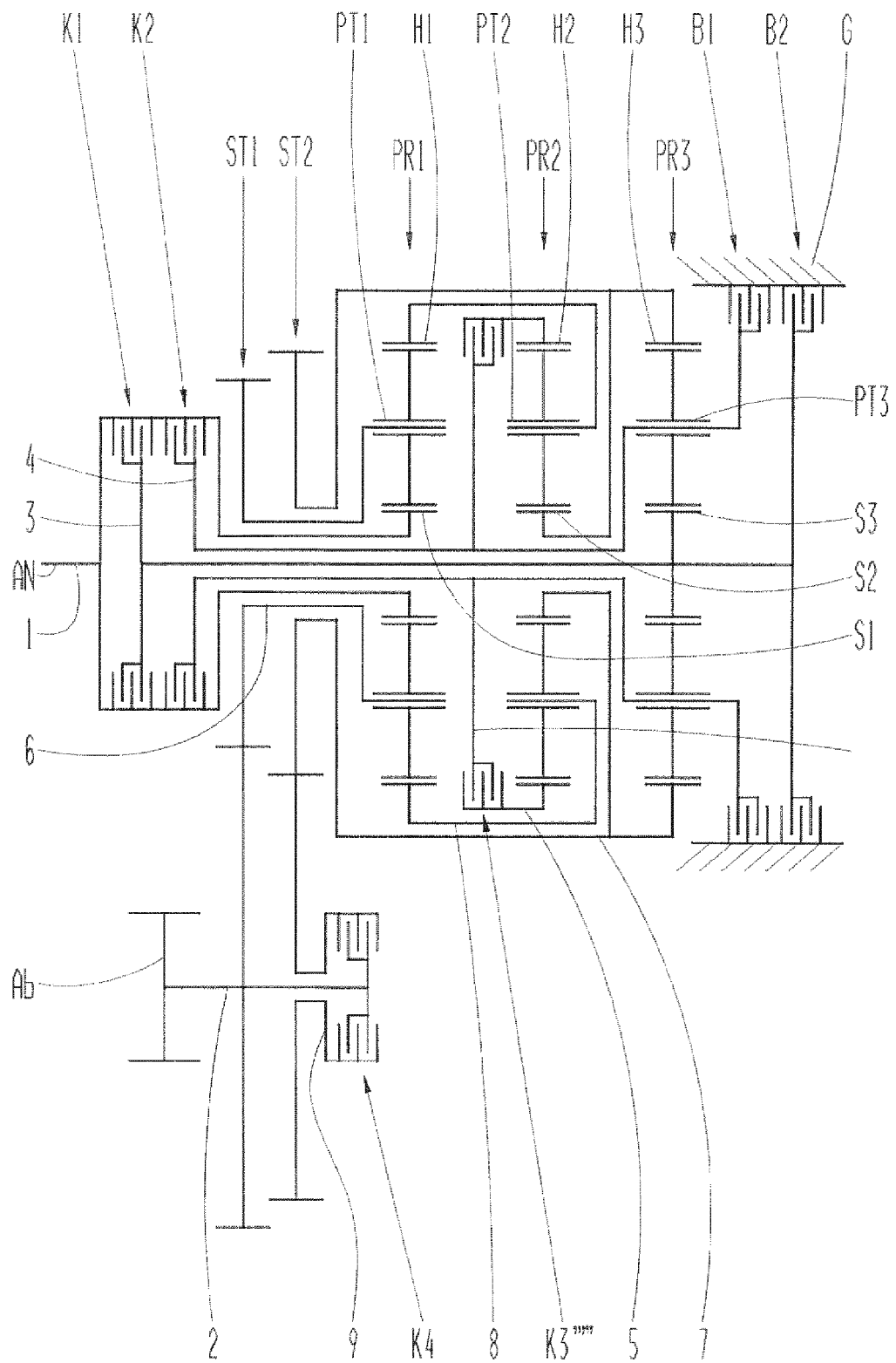
FIG. 6 is a schematic view of a sixth preferred embodiment of a transmission in accordance with the invention.

FIG. 6 shows a sixth variant of the transmission described in FIG. 1. One of the significant differences when compared to the arrangement described in FIG. 1 is the positioning of the third clutch K3'''. The also results in different connections and interfaces of the individual elements, which are more specifically addressed below. The third clutch K3'''' is arranged coaxially to the drive shaft 1 between the first planetary gear set PR1 and the second planetary gear set PR2. The drive shaft 1 is connectable to the fourth shaft 4 through the second clutch K2, and the fourth shaft 4 is further connected to the planetary carrier PT3 of the third planetary gear set PR3. The planetary carrier PT3 of the third planetary gear set PR3 is also connected to the first brake B1 through the fourth shaft 4. However, unlike that described in FIG. 1, the fourth shaft 4 is not also connected to the ring gear H2 of the second planetary gear set PR2, but is connectable to the fifth shaft 5 through the third clutch K3''''. The fifth shaft 5 is further connected to the ring gear H2 of the second planetary gear set PR2. In addition, the drive shaft 1 is directly connected to the sun gear S1 of the first planetary gear set PR1. All additional interfaces and connections, along with the arrangements of the components and elements, correspond to the arrangement described in FIG. 1. With the exception of the third clutch K3'''', all shift elements in the arrangement shown in FIG. 6 are positioned in such a manner that they are easily accessible from the outside. This means that no connection element or shaft is arranged between the respective shift element and the housing G.

Figure 7:
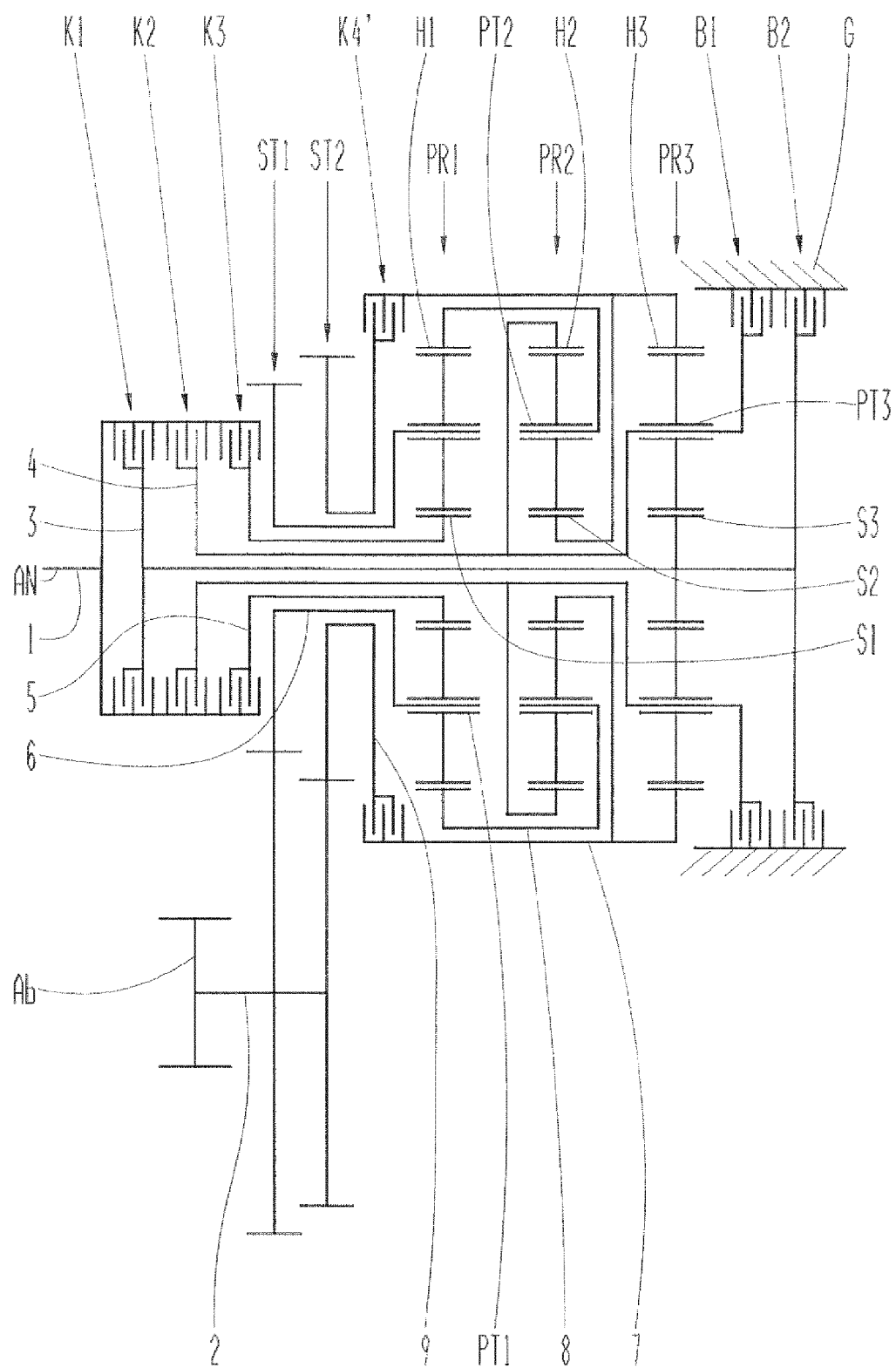
FIG. 7 is a schematic view of a seventh preferred embodiment of a transmission in accordance with the invention.

FIG. 7 shows an additional embodiment of the transmission described in FIG. 1. When compared to the embodiment of the transmission shown in FIG. 1, a significant difference of the embodiment shown in FIG. 7 consists of the arrangement of the fourth clutch K4', Thereby, differences with respect to connections and/or interfaces arise, which are more specifically addressed below. In the variant of the transmission shown in FIG. 7, the fourth clutch K4' is arranged coaxially to the drive shaft 1 between the second spur gear set ST2 and the first planetary gear set PR1. The sun gear S2 of the second planetary gear set PR2 is further connected to the ring gear H3 of the third planetary gear set PR3 through the seventh shaft 7. However, in deviation from FIG. 1, the seventh shaft 7 is now also connectable to the ninth shaft 9 through the fourth clutch K4', whereas the ninth shaft 9 is further connected to the second spur gear set ST2, and the second spur gear set ST2 is further connected to the output shaft 2. All shift elements are arranged in such a manner that they are easily accessible from the outside. This means that no additional shafts or connection elements are arranged between the respective shift element and the housing G. In the variant of the transmission shown in FIG. 7, the output shaft 2 is free of shift elements.

In a table, FIG. 8 shows a shift matrix of the transmission described in FIG. 1 to FIG. 7. By means of an X in the corresponding box, the shift element that is locked for the realization of the first to tenth forward gear and the reverse gear is made clear. In addition, the transmission ratio of the respective gear is specified, whereas the first forward gear features a transmission ratio relationship of i=5.444, the second forward gear features a transmission ratio relationship of i=3.845, the third forward gear features a transmission ratio relationship of i=2.979, the fourth forward gear features a transmission ratio relationship of i=1.947, the fifth forward gear features a transmission ratio relationship of i=1.442, the sixth forward gear features a transmission ratio relationship of i=1.101, the seventh forward gear features a transmission ratio relationship of i=1.0, the eighth forward gear features a transmission ratio relationship of i=0.929, the ninth forward gear features a transmission ratio relationship of i=0.761 and the tenth forward gear features a transmission ratio relationship of i=0.605. Given the reversal of direction of the rotary movement, the reverse gear features a negative transmission ratio relationship of i=−2.947. Here, "transmission ratio" and "transmission ratio relationship" are synonymous.

The corresponding gear jumps of the forward gears can also be derived from the table. Under "gear jump," the quotient of the transmission ratio of the low forward gear and the next higher forward gear is understood. Thereby, the gear jump from the first forward gear to the second forward gear features a value of φ=1.416, the gear jump from the second forward gear to the third forward gear features a value of φ=1.291, the gear jump from the third forward gear to the fourth forward gear features a value of φ=1.530, the gear jump from the fourth forward gear to the fifth forward gear features a value of φ=1.350, the gear jump from the fifth forward gear to the sixth forward gear features a value of φ=1.310, the gear jump from the sixth forward gear to the seventh forward gear features a value of φ=1.101, the gear jump from the seventh forward gear to the eighth forward gear features a value of φ=1.076, the gear jump from the eighth forward gear to the ninth forward gear features a value of φ=1.221 and the gear jump from the ninth forward gear to the tenth forward gear features a value of φ=1.258. The gear spread, as a quotient of the lowest forward gear and the highest forward gear, amounts to 9.003.

The first forward gear can be represented by the locked first brake B1, the locked first clutch K1 and the locked third clutch K3. The second forward gear can be represented by the locked first brake B1, the locked second brake B2 and the locked third clutch K3. The third forward gear can be represented by the locked first brake B1, the locked third clutch K3 and the locked fourth clutch K4. The fourth forward gear can be represented by the locked second brake B2, the locked third clutch K3 and the locked fourth clutch K4. The fifth forward gear can be represented by the locked first clutch K1, the locked third clutch K3 and the locked fourth clutch K4. The sixth forward gear can be represented by the locked second clutch K2, the locked third clutch K3 and the locked fourth clutch K4. The seventh forward gear can be represented by the locked first clutch K1, the locked second clutch K2 and the locked third clutch K3. The eighth forward gear can be represented by the locked second brake B2, the locked second clutch K2 and the locked third clutch K3. The ninth forward gear can be represented by the locked first clutch K1, the locked second clutch K2 and the locked fourth clutch K4. The tenth forward gear can be represented by the locked second brake B2, the locked second clutch K2 and the locked fourth clutch K4. The reverse gear can be represented by the locked first brake B1, the locked first clutch K1 and the locked fourth clutch K4.

The shifting states of the alternative embodiments of the third clutch K3', K3'', K3''', K3'''' are identical to the shifting states of the third clutch K3. The same applies to the shifting state of the alternative embodiment of the fourth clutch K4' and the shifting state of the fourth clutch K4. This means that, for example, the shifting states of the alternative embodiments of the third clutch K3', K3'', K''', K3'''' are defined in the table, for example, through the shifting state of the third clutch K3.

Modifications and variations can be made to the embodiments illustrated or described herein without departing from the scope and spirit of the invention as set forth in the appended claims.

The invention claimed is:

1. A transmission particularly suited for a motor vehicle, the transmission comprising:
    a drive shaft (1);
    an output shaft (2);
    a housing (G);
    a first planetary gear set (PR1), a second planetary gear set (PR2), and a third planetary gear set (PR3), each planetary gear set comprising a sun gear (S1, S2, S3), a planetary gear, a planetary carrier (PT1, PT2, PT3), and a ring gear (H1, H2, H3);
    six shift elements provided as a first brake (B1), a second brake (B2), a first clutch (K1), a second clutch (K2), a third clutch (K3, K3', K3'', K3''', K3'''', K3'''''), and a fourth clutch (K4, K4'), wherein the shift elements are selectively actuated to provide ten forward gears and one reverse gear through different transmission ratio relationships between the drive shaft and the output shaft;
    the drive shaft (1) and the output shaft (2) arranged with offset axes relative to each other;
    the drive shaft (1) connectable to the sun gear (S3) of the third planetary gear set (PR3) and the second brake (B2) directly through the first clutch (K1), and connectable to the planetary carrier (PT3) of the third planetary gear set (PR3) directly through the second clutch (K2);
    the planetary carrier of the third planetary gear (PR3) set further connected to the first brake (B1); and
    wherein a torque is transferable through a first spur gear set (ST1) or a second spur gear set (ST2) between the drive shaft (1) and the output shaft (2).

2. The transmission according to claim 1, wherein the first clutch (K1), the second clutch (K2), the third clutch (K3, K3', K3'', K3''', K3'''', K3'''''), the first brake (B1) and the second brake (B2) are arranged coaxially to the drive shaft (1), and the fourth clutch (K4, K4') is arranged coaxially to the output shaft (2).

3. The transmission according to claim 1, wherein the first clutch (K1), the second clutch (K2), the first brake (B1) and the second brake (B2) are arranged coaxially to the drive shaft (1), and the third clutch (K3, K3', K3'', K3''', K3'''', K3'''''), and the fourth clutch (K4, K4') are arranged coaxially to the output shaft (2).

4. The transmission according to claim 1, wherein the first clutch (K1), the second clutch (K2), the third clutch (K3, K3', K3'', K3''', K3'''', K3'''''), the fourth clutch (K4, K4'), the first brake (B1), and the second brake (B2) are arranged coaxially to the drive shaft (1).

5. The transmission according to claim 1, wherein:
    (a) the drive shaft (1) is connectable to the ring gear (H2) of the second planetary gear set (PR2) through the second clutch (K2);
    (b) the drive shaft (1) is connectable to the sun gear (S1) of the first planetary gear set (PR1) through the third clutch (K3);
    (c) the planetary carrier (PT1) of the first planetary gear set (PR1) is connected to a first spur gear set (ST1), and the first spur gear set (ST1) is further connected to the output shaft (2);
    (d) the planetary carrier (PT2) of the second planetary gear set (PR2) is connected to the ring gear (H1) of the first planetary gear set (PR1); and
    (e) the sun gear (S2) of the second planetary gear set (PR2) is connected to the ring gear (H3) of the third planetary gear set (PR3) and to a second spur gear set (ST2), and the second spur gear set (ST2) is connectable to the output shaft (2) through the fourth clutch (K4).

6. The transmission according to claim 1, wherein:
    (a) the drive shaft (1) is connectable to the ring gear (H2) of the second planetary gear set (PR2) through the second clutch (K2);
    (b) the drive shaft (1) is connected to the sun gear (S1) of the first planetary gear set (PR1);
    (c) the planetary carrier (PT1) of the first planetary gear set (PR1) is connectable to a first spur gear set (ST1)

through the third clutch (K3'), and the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

7. The transmission according to claim 1, wherein:
(a) the drive shaft (1) is connectable to the ring gear (H2) of the second planetary gear set (PR2) through the second clutch (K2);
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is connectable to the output shaft (2) through the third clutch (K3");
(d) the planetary carrier (PT2) of the second planetary gear set (PR2) is connected to the ring gear (H1) of the first planetary gear set (PR1); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

8. The transmission according to claim 1, wherein:
(a) the drive shaft (1) is connectable to the ring gear (H2) of the second planetary gear set (PR2) through the second clutch (K2);
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connectable to the ring gear (H1) of the first planetary gear set (PR1) through the third clutch (K3'''); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

9. The transmission according to claim 1, wherein:
(a) the drive shaft (1) is connectable to the ring gear (H2) of the second planetary gear set (PR2) through the second clutch (K2);
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connectable to the ring gear (H3) of the third planetary gear set (PR3) and a second spur gear set (ST2) through the third clutch (K3''''), and the second spur gear set (ST2) is connectable to the output shaft (2) through the fourth clutch (K4).

10. The transmission according to claim 1, wherein:
(a) the drive shaft (1) is connectable to the ring gear (H2) of the second planetary gear set (PR2) through the second clutch (K2) and the third clutch (K3''''');
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

11. The transmission according to claim 1, wherein:
(a) the drive shaft (1) is connectable to the ring gear (H2) of the second planetary gear set (PR2) through the second clutch (K2);
(b) the drive shaft (1) is connectable to the sun gear (S1) of the first planetary gear set (PR1) through the third clutch (K3);
(c) the planetary carrier (PT1) of the first planetary gear set (PR1) is connected to a first spur gear set (ST1), whereas the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connected to the ring gear (H3) of the third planetary gear set (PR3) and is connectable to a second spur gear set (ST2) through the fourth clutch (K4'), and the second spur gear set (ST2) is further connected to the output shaft (2).

12. The transmission according to claim 1, wherein:
(a) the first forward gear is represented by the first brake (B1) locked, the first clutch (K1) locked, and the third clutch (K3, K3', K3", K3''', K3'''', K3''''') locked;
(b) the second forward gear is represented by the first brake (B1) locked, the second brake (B2) locked, and the third clutch (K3, K3', K3", K3''', K3'''', K3''''') locked;
(c) the third forward gear is represented by the first brake (B1) locked, the third clutch (K3, K3', K3", K3''', K3'''', K3''''') locked, and the fourth clutch (K4, K4') locked;
(d) the fourth forward gear is represented by the second brake (B2) locked, the third clutch (K3, K3', K3", K3''', K3'''', K3''''') locked, and the fourth clutch (K4, K4') locked;
(e) the fifth forward gear is represented by the first clutch (K1) locked, the third clutch (K3, K3', K3", K3''', K3'''', K3''''') locked, and the fourth clutch (K4, K4') locked;
(f) the sixth forward gear is represented by the second clutch (K2) locked, the third clutch (K3, K3', K3", K3''', K3'''', K3''''') locked, and the fourth clutch (K4, K4') locked;
(g) the seventh forward gear is represented by the first clutch (K1) locked, the second clutch (K2) locked, and the third clutch (K3, K3', K3", K3''', K3'''', K3''''') locked;

(h) the eighth forward gear is represented by the second brake (B2) locked, the second clutch (K2) locked, and the third clutch (K3, K3', K3", K3''', K3"", K3''''') locked;

(i) the ninth forward gear is represented by the first clutch (K1) locked, the second clutch (K2) locked, and the fourth clutch (K4, K4') locked;

(j) the tenth forward gear is represented by the second brake (B2) locked, the second clutch (K2) locked, and the fourth clutch (K4, K4') locked; and (k) the reverse gear is represented by the first brake (B1) locked, the first clutch (K1) locked, and the fourth clutch (K4, K4') locked.

13. A method for operating the transmission according to claim 1, wherein:

the ten forward gears are selected in such a manner that, in each of the forward gears, three shift elements are locked and the remaining shift elements are open; and and a gear change to an adjacent higher gear or to an adjacent lower gear is made by closing at least one previously open shift element and by opening at least one previously locked shift element.

14. A transmission particularly suited for a motor vehicle, the transmission comprising:

a drive shaft (1);
an output shaft (2);
a housing (G);
a first planetary gear set (PR1), a second planetary gear set (PR2), and a third planetary gear set (PR3), each planetary gear set comprising a sun gear (S1, S2, S3), a planetary gear, a planetary carrier (PT1, PT2, PT3), and a ring gear (H1, H2, H3);

six shift elements provided as a first brake (B1), a second brake (B2), a first clutch (K1), a second clutch (K2), a third clutch (K3, K3', K3", K3''', K3"", K3'''''), and a fourth clutch (K4, K4'), wherein the shift elements are selectively actuated to provide ten forward gears and one reverse gear through different transmission ratio relationships between the drive shaft and the output shaft;

the drive shaft (1) and the output shaft (2) arranged with offset axes relative to each other;

the drive shaft (1) connectable to the sun gear (S3) of the third planetary gear set (PR3) and the second brake (B2) directly through the first clutch (K1), and connectable to the planetary carrier (PT3) of the third planetary gear set (PR3) directly through the second clutch (K2);

the planetary carrier of the third planetary gear (PR3) set further connected to the first brake (B1);

wherein the reverse gear is represented by the first brake (B1) locked, the first clutch (K1) locked, and the fourth clutch (K4, K4') locked; and wherein a torque is transferable through a first spur gear set (ST1) or a second spur gear set (ST2) between the drive shaft (1) and the output shaft (2).

15. The transmission according to claim 14, wherein the first clutch (K1), the second clutch (K2), the third clutch (K3, K3', K3", K3''', K3"", K3'''''), the first brake (B1) and the second brake (B2) are arranged coaxially to the drive shaft (1), and the fourth clutch (K4, K4') is arranged coaxially to the output shaft (2).

16. The transmission according to claim 14, wherein the first clutch (K1), the second clutch (K2), the first brake (B1) and the second brake (B2) are arranged coaxially to the drive shaft (1), and the third clutch (K3, K3', K3", K3''', K3"", K3'''''), and the fourth clutch (K4, K4') are arranged coaxially to the output shaft (2).

17. The transmission according to claim 14, wherein the first clutch (K1), the second clutch (K2), the third clutch (K3, K3', K3", K3''', K3"", K3'''''), the fourth clutch (K4, K4'), the first brake (B1), and the second brake (B2) are arranged coaxially to the drive shaft (1).

18. The transmission according to claim 14, wherein:

(a) the drive shaft (1) is connectable to the ring gear (H2) of the second planetary gear set (PR2) through the second clutch (K2);

(b) the drive shaft (1) is connectable to the sun gear (S1) of the first planetary gear set (PR1) through the third clutch (K3);

(c) the planetary carrier (PT1) of the first planetary gear set (PR1) is connected to a first spur gear set (ST1), and the first spur gear set (ST1) is further connected to the output shaft (2);

(d) the planetary carrier (PT2) of the second planetary gear set (PR2) is connected to the ring gear (H1) of the first planetary gear set (PR1); and (e) the sun gear (S2) of the second planetary gear set (PR2) is connected to the ring gear (H3) of the third planetary gear set (PR3) and to a second spur gear set (ST2), and the second spur gear set (ST2) is connectable to the output shaft (2) through the fourth clutch (K4).

19. The transmission according to claim 14, wherein:

(a) the drive shaft (1) is connectable to the ring gear (H2) of the second planetary gear set (PR2) through the second clutch (K2);

(b) the drive shaft (1) is connected to the sun gear (S1) of the first planetary gear set (PR1);

(c) the planetary carrier (PT1) of the first planetary gear set (PR1) is connectable to a first spur gear set (ST1) through the third clutch (K3'), and the first spur gear set (ST1) is further connected to the output shaft (2);

(d) the planetary carrier (PT2) of the second planetary gear set (PR2) is connected to the ring gear (H1) of the first planetary gear set (PR1); and (e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

20. The transmission according to claim 14, wherein:

(a) the drive shaft (1) is connectable to the ring gear (H2) of the second planetary gear set (PR2) through the second clutch (K2);

(b) the drive shaft (1) is connected to the sun gear (S1) of the first planetary gear set (PR1);

(c) the planetary carrier (PT1) of the first planetary gear set (PR1) is connected to a first spur gear set (ST1), and the first spur gear set (ST1) is connectable to the output shaft (2) through the third clutch (K3");

(d) the planetary carrier (PT2) of the second planetary gear set (PR2) is connected to the ring gear (H1) of the first planetary gear set (PR1); and (e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

21. The transmission according to claim 14, wherein;
(a) the drive shaft (1) is connectable to the ring gear (H2) of the second planetary gear set (PR2) through the second clutch (K2);
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connectable to the ring gear (H1) of the first planetary gear set (PR1) through the third clutch (K3'''); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

22. The transmission according to claim 14, wherein:
(a) the drive shaft (1) is connectable to the ring gear (H2) of the second planetary gear set (PR2) through the second clutch (K2);
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connectable to the ring gear (H3) of the third planetary gear set (PR3) and a second spur gear set (ST2) through the third clutch (K3''''), and the second spur gear set (ST2) is connectable to the output shaft (2) through the fourth clutch (K4).

23. The transmission according to claim 14, wherein:
(a) the drive shaft (1) is connectable to the ring gear (H2) of the second planetary gear set (PR2) through the second clutch (K2) and the third clutch (K3''''');
(b) the drive shaft (1) is connected to the sun gear (S1) of the first planetary gear set (PR1);
(c) the planetary carrier (PT1) of the first planetary gear set (PR1) is connected to a first spur gear set (ST1), and the first spur gear set (ST1) is further connected to the output shaft (2);
(d) the planetary carrier (PT2) of the second planetary gear set (PR2) is connected to the ring gear (H1) of the planetary gear set (PR1); and
(e) the sun gear (S2) of the second planetary gear set (PR2) is connected to the ring gear (H3) of the third planetary gear set (PR3) and a second spur gear set (ST2), and the second spur gear set (ST2) is connectable to the output shaft (2) through the fourth clutch (K4).

24. The transmission according to claim 14, wherein:
(a) the drive shaft (1) is connectable to the ring gear (H2) of the second planetary gear set (PR2) through the second clutch (K2);
(b) the drive shaft (1) is connectable to the sun gear (S1) of the first planetary gear set (PR1) through the third clutch (K3);
(c) the planetary carrier (PT1) of the first planetary gear set (PR1) is connected to a first spur gear set (ST1), whereas the first spur gear set (ST1) is further connected to the output shaft (2);
(d) the planetary carrier (PT2) of the second planetary gear set (PR2) is connected to the ring gear (H1) of the first planetary gear set (PR1); and
(e) the sun gear (S2) of the second planetary gear set (PR2) is connected to the ring gear (H3) of the third planetary gear set (PR3) and is connectable to a second spur gear set (ST2) through the fourth clutch (K4'), and the second spur gear set (ST2) is further connected to the output shaft (2).

25. The transmission according to claim 14, wherein:
(a) the first forward gear is represented by the first brake (B1) locked, the first clutch (K1) locked, and the third clutch (K3, K3', K3'', K3''', K3'''', K3''''') locked;
(b) the second forward gear is represented by the first brake (B1) locked, the second brake (B2) locked, and the third clutch (K3, K3', K3'', K3''', K3'''', K3''''') locked;
(c) the third forward gear is represented by the first brake (B1) locked, the third clutch (K3, K3', K3'', K3''', K3'''', K3''''') locked, and the fourth clutch (K4, K4') locked;
(d) the fourth forward gear is represented by the second brake (B2) locked, the third clutch (K3, K3', K3'', K3''', K3'''', K3''''') locked, and the fourth clutch (K4, K4') locked;
(e) the fifth forward gear is represented by the first clutch (K1) locked, the third clutch (K3, K3', K3'', K3''', K3'''', K3''''') locked, and the fourth clutch (K4, K4') locked;
(f) the sixth forward gear is represented by the second clutch (K2) locked, the third clutch (K3, K3', K3'', K3''', K3'''', K3''''') locked, and the fourth clutch (K4, K4') locked;
(g) the seventh forward gear is represented by the first clutch (K1) locked, the second clutch (K2) locked, and the third clutch (K3, K3', K3'', K3''', K3'''', K3''''') locked;
(h) the eighth forward gear is represented by the second brake (B2) locked, the second clutch (K2) locked, and the third clutch (K3, K3', K3'', K3''', K3'''', K3''''') locked;
(i) the ninth forward gear is represented by the first clutch (K1) locked, the second clutch (K2) locked, and the fourth clutch (K4, K4') locked; and
(j) the tenth forward gear is represented by the second brake (B2) locked, the second clutch (K2) locked, and the fourth clutch (K4, K4') locked.

26. A method for operating the transmission according to claim 14, wherein:
the ten forward gears are selected in such a manner that, in each of the forward gears, three shift elements are locked and the remaining shift elements are open; and
and a gear change to an adjacent higher gear or to an adjacent lower gear is made by closing at least one previously open shift element and by opening at least one previously locked shift element.

* * * * *